(12) United States Patent
Sachtleben

(10) Patent No.: US 11,369,225 B2
(45) Date of Patent: Jun. 28, 2022

(54) FILTER PAPER INSERT AND FILTER BASKET WITH FILTER PAPER INSERT

(71) Applicant: MELITTA EUROPA GMBH & CO. KG, Minden (DE)

(72) Inventor: Andreas Sachtleben, Minden (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 547 days.

(21) Appl. No.: 16/417,567

(22) Filed: May 20, 2019

(65) Prior Publication Data

US 2019/0365135 A1 Dec. 5, 2019

(30) Foreign Application Priority Data

May 30, 2018 (DE) .................... 20 2018 103 061.2

(51) Int. Cl.
*A47J 31/06* (2006.01)
*A47J 31/08* (2006.01)

(52) U.S. Cl.
CPC ........... *A47J 31/0631* (2013.01); *A47J 31/08* (2013.01)

(58) Field of Classification Search
CPC ........ A47J 31/0631; A47J 31/08; A47J 31/06; A47J 31/446; A47J 31/0642; A47J 31/44; A47J 31/3695; A47J 31/0668; A47J 31/002; A47J 31/005; A47J 31/02; A47J 31/0626
USPC ......... 99/279, 285, 287, 292, 295, 304, 306, 99/321, 322, 323; 426/534, 594, 433, 426/435, 112, 115, 77, 78, 79, 82, 84, 86; 210/474, 478, 479, 481, 482, 489, 506
See application file for complete search history.

(56) References Cited

U.S. PATENT DOCUMENTS

| | | | | |
|---|---|---|---|---|
| 2002/0062741 A1* | 5/2002 | Rohde | ..................... | A47J 31/08 99/321 |
| 2002/0185010 A1* | 12/2002 | Spiteri | .................... | A47J 31/08 99/285 |
| 2008/0245727 A1* | 10/2008 | Muller | .................... | A47J 31/08 210/506 |
| 2009/0139926 A1* | 6/2009 | Hassebrauck | ........... | A47J 31/08 210/497.3 |
| 2010/0252496 A1* | 10/2010 | Freiheit | ................... | A47J 31/08 210/489 |
| 2012/0207896 A1* | 8/2012 | Rivera | ................ | A47J 31/0689 426/433 |
| 2018/0206667 A1* | 7/2018 | Footz | ................. | B65D 43/0233 |

FOREIGN PATENT DOCUMENTS

| | | |
|---|---|---|
| DE | 2515946 A1 | 10/1976 |
| DE | 69106137 T2 | 5/1995 |
| EP | 2793662 B1 | 11/2016 |
| EP | 3289935 A1 | 3/2018 |

OTHER PUBLICATIONS

Search Report for German Application No. 20 2018 103 061.2 dated Nov. 15, 2018.

* cited by examiner

*Primary Examiner* — Phuong T Nguyen
(74) *Attorney, Agent, or Firm* — FisherBroyles, LLP; Robert Kinberg

(57) ABSTRACT

A filter paper insert for producing a brewed beverage includes a first side wall and a second side wall which are respectively connected along opposite sides by one of a seam and a folding edge, and are connected via a bottom seam. The insert has an opening for filling the filter paper insert opposite the bottom seam. The bottom seam has a shape that deviates from a straight line.

13 Claims, 4 Drawing Sheets

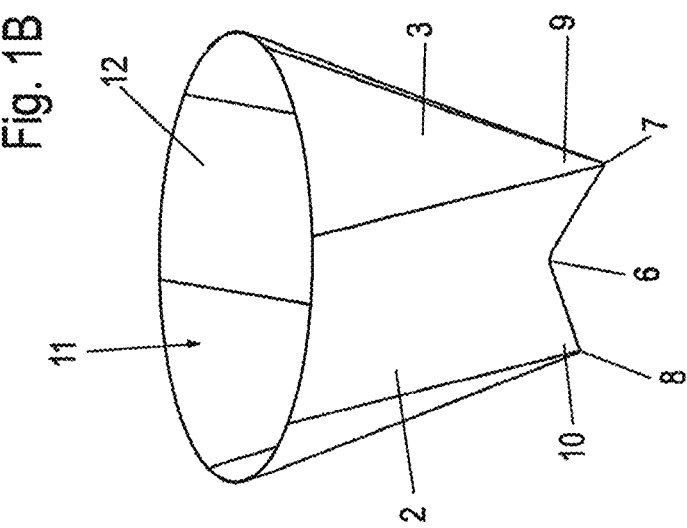
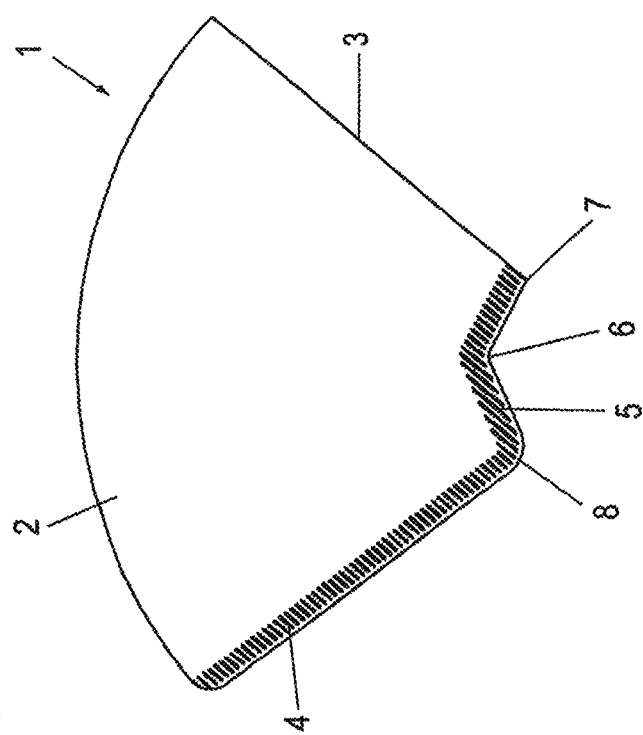

FILTER PAPER INSERT AND FILTER BASKET WITH FILTER PAPER INSERT

CROSS-REFERENCE TO RELATED APPLICATIONS

This application claims priority to German Application No. 20 2018 103 061.2 filed on May 30, 2018, the entire disclosure of which is incorporated herein by reference.

BACKGROUND OF THE INVENTION

The present invention relates to a filter paper insert for producing a brewed beverage, comprising a first side wall and a second side wall which are connected on opposite sides by respectively a seam or a folding edge and are also connected via a bottom seam, wherein an opening for filling the filter paper insert is formed opposite the bottom seam. The invention further relates to a filter basket with a filter paper insert.

A filter paper insert is disclosed in European patent document EP 2 793 662 B1 which comprises two side walls that are connected at the bottom via a straight seam and at opposite sides via a seam or a folding edge. The filter paper insert contains slits which allow a larger amount of oils as flavor carriers to pass through during the brewing process, thereby improving the coffee taste. With these filter paper inserts, hot water is poured over the coffee grounds inside the filter paper insert, to extract soluble components from the ground coffee. The liquid can penetrate the filter paper and can flow in the bottom region toward an outlet opening in the filter basket. Most of the coffee thus flows out via the bottom region of the filter paper insert, wherein a center opening is provided in most cases in the bottom of the filter basket. As a result, the liquid essentially flows in the center downward through the filter paper insert and, at least in the center, has at a higher speed than in the edge regions, which leads to excessive extraction of the coffee in the center region while there is less extraction in the edge regions.

To improve this known problem of uneven extraction, a filter basket is proposed in European patent document EP 3 289 935 A1 which contains two outlet areas in the bottom region, approximately equal in size, which are divided such that the liquid flows out through two spaced-apart outlet areas, thereby resulting in a more uniform extraction of the coffee grounds. However, a great many filter baskets in existing coffee machines contain only one outlet opening.

SUMMARY OF THE INVENTION

It is therefore an object of the present invention to create a filter paper insert for producing a brewed beverage, which results in a more uniform extraction of an extraction material.

The above and other objects are solved with a filter paper filter paper insert for producing a brewed beverage that includes a first side wall and a second side wall which are respectively connected along opposite sides by one of a seam and a folding edge, and are connected via a bottom seam, wherein the insert has an opening for filling the filter paper insert opposite the bottom seam and wherein the bottom seam has a shape that deviates from a straight line.

With the filter paper insert according to the invention, two side walls are connected in the lower region via a bottom seam having a shape that deviates from a straight line, meaning the bottom seam connecting the two side walls does not form a straight line or straight strip. A liquid flow through the coffee grounds which cannot be predicted and reproduced is therefore avoided. The inventive design of the bottom seam causes the water to flow more uniformly through defined outlet regions of the filter paper insert. During the brewing operation and because of the bottom seam design, the liquid does not primarily flow centrally through the filter paper insert but can increasingly also flow through the non-central areas. A bottom seam that is not straight has the advantage of resulting in different height areas, which ensure a more uniform flow-through, even in the non-central region of the filter insert.

At least two lower outlet areas and one higher-positioned saddle-type section that connects the at least two outlet areas are formed along the bottom seam in the brewing position. The advantage here is that with an opened filter paper insert, a saddle-shaped area forms in the center region of the bottom seam, from which the walls of the filter paper insert tilt downward toward the tips. The outlet funnels forming in the opened filter paper cause a directional, reproducible flow of the extraction means through the coffee grounds. Liquid then flows at a higher rate through the at least two lower outlet openings than through the higher-positioned connecting section, which improves the extraction since more liquid flows out through the at least two lower outlet openings.

The outlet areas in this case can be embodied pointedly converging in downward direction, for example funnel-shaped, wherein a special geometry of the outlet areas is not important, and they do not need to form a precise cone. The flow through the lower-arranged outlet areas is stronger as compared to the higher-positioned connecting section, thus also enlarging the regions having a higher flow as compared to a filter paper insert with horizontal bottom seam.

The bottom seam is preferably formed with isosceles legs [two uniformly long straight legs], arranged at an angle that is open toward the bottom. Once the filter paper insert is inserted into a filter basket, a saddle-type structure forms at the apex of the angle formed by the side walls. The side walls are inclined from this saddle toward the a respective one of the outlet tips.

The bottom seam is preferably formed symmetrical to a center plane.

The bottom seam can furthermore be embodied curved or at least with a curved section. By having a curved shape in the center, the bottom seam of the filter insert can be adapted better to the shape of a filter basket, for example provided with several outlet openings separated by a separating element. The separating element can also be embodied curved in the upper region to create a positive connection between the bottom seam of the filter insert and the separating element.

The angle of a side seam or folding edge, relative to the adjacent bottom seam, is preferably smaller than 130°, in particular 120°, and thus smaller than for a filter paper insert with horizontal bottom seam. The bottom seam can have two angled sections that are oriented relative to each other at an angle of less than 160°, especially less than 150°. The two angled sections can be positioned in a range from 100° to 160° and in particular 120° to 150°.

According to the invention, a filter basket with filter paper insert is also made available. The filter basket preferably has two outlet openings which are assigned to two outlet areas in the filter paper insert, so that each outlet area of the filter insert is positioned above at least one outlet opening in the filter basket. The filter basket can be provided with an upward pointing separating element between the outlet openings which is adapted, for example, to the shape of the bottom seam of the filter paper insert, to ensure a form-fitting support for the filter paper insert.

BRIEF DESCRIPTION OF THE DRAWINGS

In the following, the invention is explained further with the aid of several exemplary embodiments and reference to the enclosed drawings, wherein:

FIGS. 1A and 1B is a first exemplary embodiment of a filter paper insert according to the invention;

DETAILED DESCRIPTION OF THE INVENTION

Figure 2:
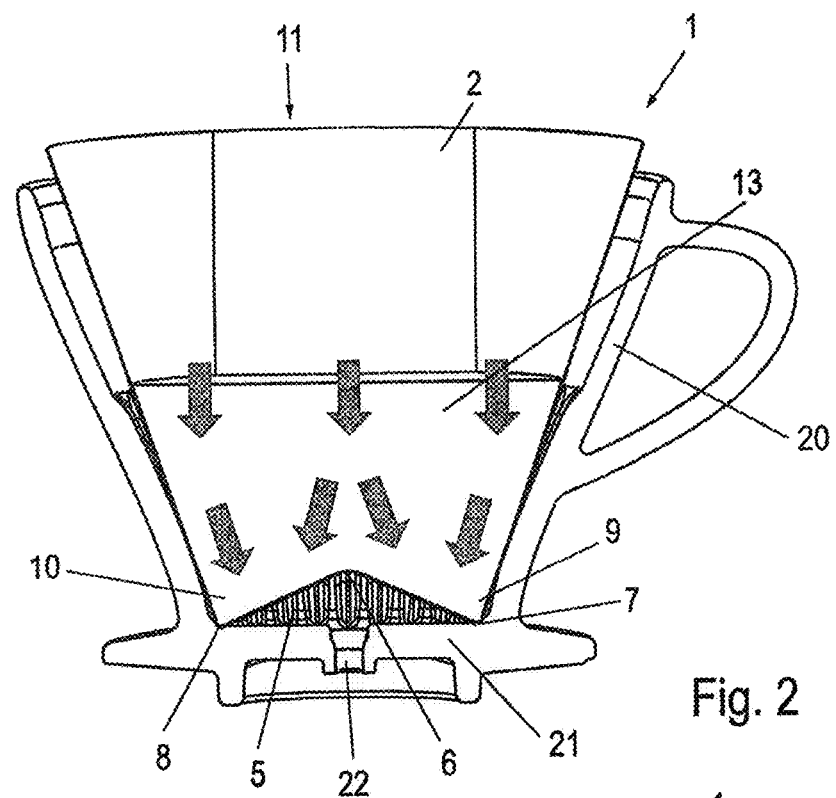
FIG. 2 is a view of the filter paper insert in FIG. 1, positioned inside a first filter basket.

A filter paper insert 1 comprises two side walls 2 and 12 which are of the same size in the folded-up position and are connected in the example shown along one side via a folding edge 3 and on the opposite side via a seam 4. A bottom seam 5 is formed on a lower side which connects to the seam 4 and ends on the opposite side at the folding edge 3. Of course, two side seams 4 can also be provided instead of the folding edge 3. The filter paper insert 1 is composed of a fibrous material on a cellulose base and can optionally also contain synthetic materials and a binder. The seams 4 and the bottom seam 5 are generated through embossing, especially through crimping of the filter paper during the assembly, for example with the use of profiled rollers which connect the layers of filter paper permanently to each other. The width of the bottom seam 5 can be selected depending on the embossed material and the strength requirements, wherein the width of the bottom seam 5 is neglected to simplify the explanation and it is described geometrically as a straight line, a curve, or bow-shaped section.

Embodied on the side opposite the bottom seam 5 is an opening 11 for filling coffee grounds or other extraction materials from above into the filter paper insert 1. In the opened position (FIG. 1B), the filter paper insert 1 has an essentially truncated cone shape.

The bottom seam 5 is not embodied as a straight line, but may be essentially V-shaped, formed by two intersecting straight lines forming an isosceles angle, wherein an upward pointing tip 6 is provided as well as two lower tips 7 and 8 located on both sides of the tip 6. As a result, a first outlet area 9 is formed above the tip 7 in the opened position of the filter paper insert 1, and a second outlet area 10 is formed above the tip 8, which outlet areas are spaced apart by a higher-positioned saddle-shaped connecting section with the tip 6. The outlet areas 9 and 10 are embodied substantially funnel-shaped.

In FIG. 2, the filter paper insert 1 is shown positioned inside a filter basket 20, forming a container that is open toward the top for inserting the filter paper insert 1, wherein a level bottom 21 with center outlet opening 22 is provided. Filter baskets 20 of this type can exist for the manual brewing or also for use in commercial coffee machines.

The filter paper insert 1 is filled with coffee grounds 13 through which hot water flows for brewing coffee, as shown symbolically with the arrows. Owing to the angle-shaped bottom seam 5, the hot water does not primarily flow toward the center to the outlet opening 22 in the filter basket 20 during the extraction of the coffee grounds 13 but flows with an increased share to the outlets areas 9 and 10 in the filter paper insert 1 which are arranged horizontally at a distance to the outlet opening 22 in the filter basket. The outlet opening 22 is essentially located below the upward pointing tip 6, so that the flow through the two edge regions of the filter paper insert 1 is stronger, thereby resulting in a more uniform extraction.

Figure 3:
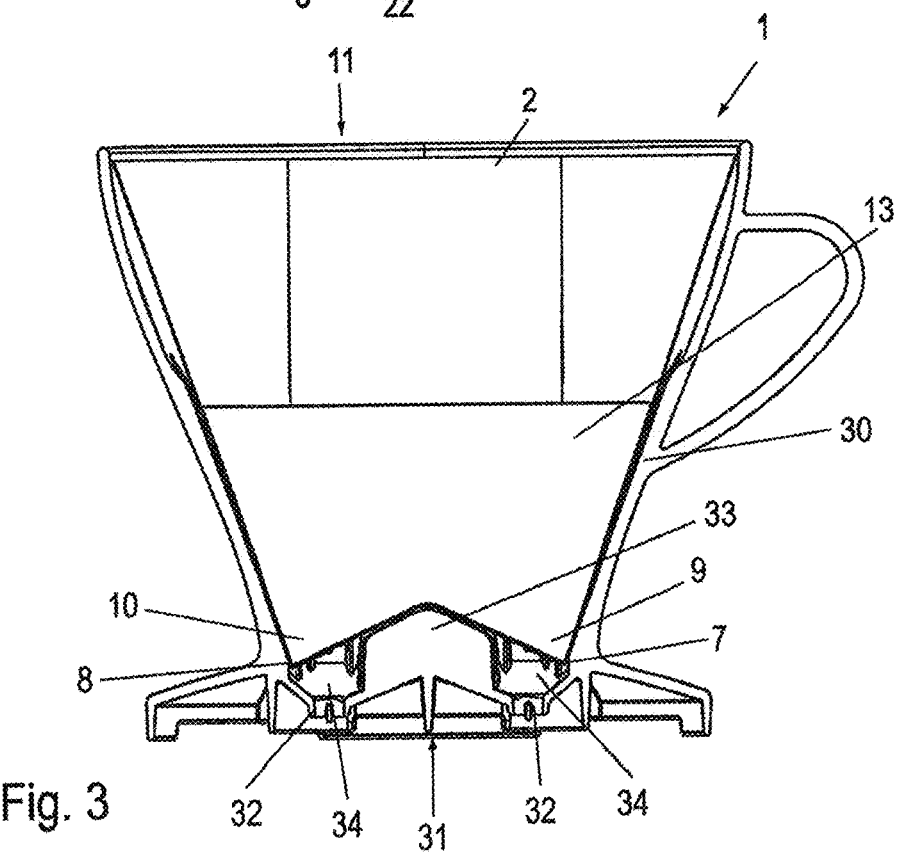
FIG. 3 is a view of the filter paper insert in FIG. 1, positioned in a second filter basket.

In FIG. 3, the filter paper insert 1 with the coffee grounds 13 is shown inserted into a modified basket 30. The filter basket 30 has a region that is open toward the top and a bottom region 31 where two spaced apart outlet openings 32 are provided. The two outlet openings 32 are separated by an upward projecting separating element 33 that forms a support for the filter paper insert 1. Provided above each outlet opening 32 is an outlet chamber 34, arranged below the filter paper insert 1. With this filter basket 30, the flow is increased because of the two outlet areas 9 and 10 in the filter paper insert 1, since each outlet area 9 and 10 is assigned to at least one outlet opening 32 in the filter basket 30, meaning the extracted liquid flows from the respective outlet area 9 or 10 to the outlet a corresponding outlet opening 32 of the filter basket. A stronger flow of hot water therefore flows through the two edge regions of the paper filter insert below the outlet areas 9 and 10 of the filter paper insert, even if the hot water is supplied from a center region.

Figure 4:
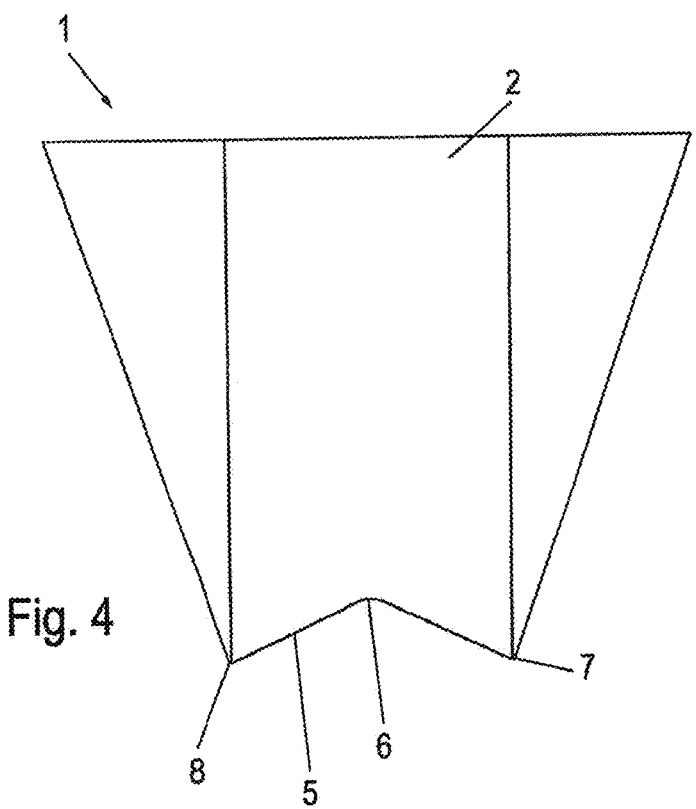
FIGS. 4 to 7 are several views of modified embodiments of filter paper inserts.
Figure 5:
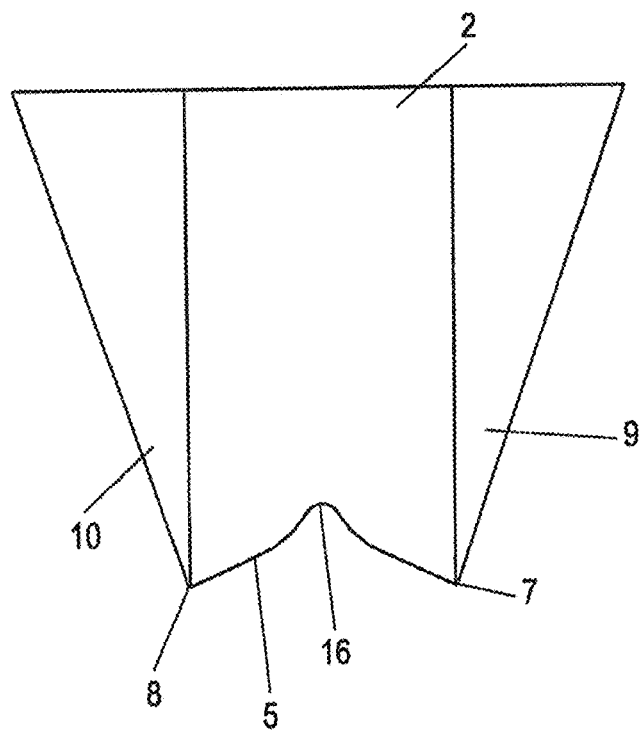

FIG. 4 shows the opened filter paper insert in a view from the side, with an essentially W-type outer contour that is formed by the folding edge 3, the seam 4 and the bottom seam 5. However, the bottom seam 5 geometry can be changed. For example, the angular bottom seam 5 can have a radius at the apex instead of a tip, as shown in FIG. 5. Instead of the tip 6, a rounded apex 16 is provided which forms a rounded transition between the two angle-shaped sections of the bottom seam 5.

Figure 6:
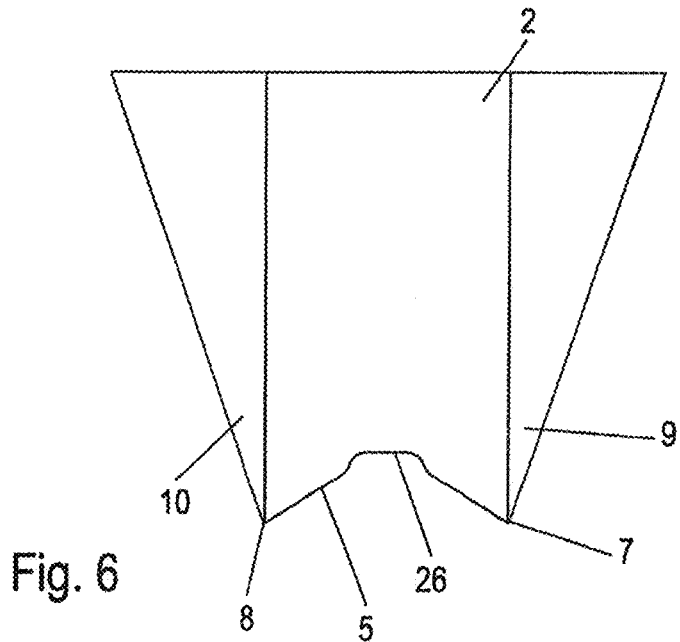

Alternatively, the bottom seam 5 according to FIG. 6 can have two angled sections which are connected via a rectangular recess 26 to a horizontal center section.

Figure 7:
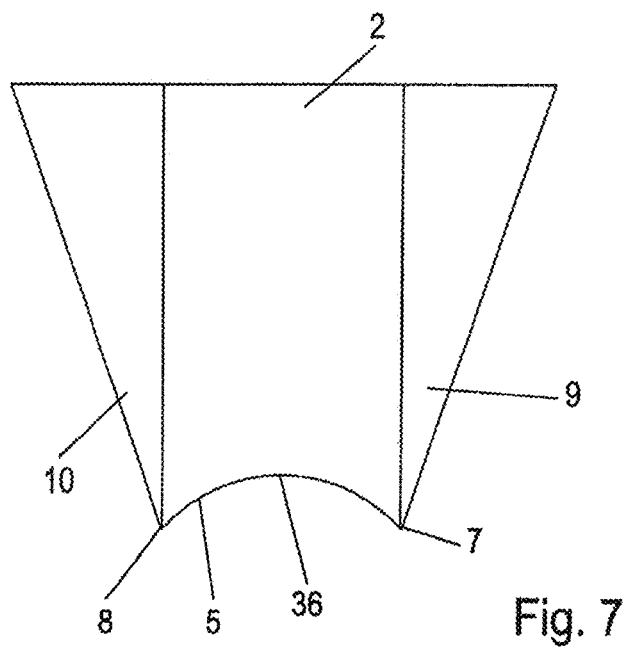

FIG. 7 shows a filter paper insert 1 with a modified bottom seam 5 that forms a curve 36, extending from the tip 7 to the tip 8. The bottom seam 5 in this case can have a circular or ellipsoid form. The distance from the highest point in the bottom seam 5 to the deep tips 7 and 8 in vertical direction can range from 5 mm to 50 mm, in particular from 10 mm to 30 mm.

In the example shown, the filter paper insert 1 has respectively two outlet areas 9 and 10 that are formed above the tips 7 and 8. Of course, it is also possible to provide more than two outlet areas 9 and 10, for example if three or more tips are formed along the bottom seam 5.

It will be understood that the above description of the present invention is susceptible to various modifications, changes and adaptations, and that the same are intended to be comprehended within the meaning and range of equivalents of the appended claims.

The invention claimed is:

1. A filter paper insert for producing a brewed beverage, comprising:
    a first side wall and a second side wall which are respectively connected along opposite sides by one of a seam and a folding edge, and are connected via a bottom seam, wherein the filter paper insert further includes a side opposite the bottom seam that comprises an opening for receiving extraction material when the first and second side walls are spread apart, and wherein the bottom seam has a shape that deviates from a straight line and has opposite ends that terminate at respective bottom tips of the paper filter insert, wherein the bottom seam has a central portion between the opposite ends that projects upwardly above the bottom tips and connects portions of the bottom seam which follow two intersecting straight lines that form an angle of less than 160°.

2. The filter paper insert according to claim 1, wherein the bottom seam is configured to present two outlet areas along the bottom seam, wherein each outlet area has a bottom at a respective one of the bottom tips of the filter, and the central portion of the bottom seam is positioned between the two outlet areas and is higher than the bottom of each outlet area.

3. The filter paper insert according to claim 2, wherein each of the two outlet areas converges downwardly to a respective one of the bottoms of the outlet areas which are located below an apex of the angle formed by the two intersecting lines.

4. The filter paper insert according to claim 2, wherein a volume in each of the outlet areas is essentially funnel-shaped when the filter paper insert is opened.

5. The filter paper insert according claim 1, wherein is the two intersecting straight lines form an isosceles angle.

6. The filter paper insert according to claim 1, wherein the bottom seam is at least in part curved.

7. The filter paper insert according to claim 1, wherein the central portion of the bottom seam has a radius and connects the two portions of the bottom seam following the two intersecting straight lines.

8. The filter paper insert according to claim 1, wherein the central portion follows a straight third line and connects the two portions of the bottom seam following the two intersecting straight lines.

9. The filter paper insert according to claim 1, wherein at least one of the side seam and the folding edge intersect the bottom seam at an angle less than 130°.

10. The filter paper insert according to claim 1, wherein the two portions of the bottom seam form the angle of less than 160°.

11. A combination of the filter paper insert according to claim 1 and a filter basket that has a shape corresponding to a shape of the filter paper insert when the first and second side walls are spread apart.

12. The combination according to claim 11, wherein the filter basket has two outlet openings and the filter paper insert has two outlet areas assigned to respective ones of the two outlet openings of the filter basket.

13. The combination according to claim 12, wherein the filter basket includes a separating element extending upwardly between the two outlet openings.

* * * * *